United States Patent [19]

Greene

[11] Patent Number: 5,261,933
[45] Date of Patent: Nov. 16, 1993

[54] VENT GAS DEODORIZING SYSTEM

[76] Inventor: Edward C. Greene, 10870 Gable St., Boca Raton, Fla. 33428

[21] Appl. No.: 743,113

[22] Filed: Aug. 9, 1991

[51] Int. Cl.⁵ ............................................. B01D 47/04
[52] U.S. Cl. .................... 95/150; 261/124; 55/279; 422/4
[58] Field of Search ............ 55/87, 164, 178, 279; 422/45, 231, 120, 123-125; 261/122, 124, DIG. 17, DIG. 26, 16

[56] References Cited

U.S. PATENT DOCUMENTS

| | | | |
|---|---|---|---|
| 810,733 | 1/1906 | Evans | 4/220 |
| 1,034,862 | 8/1912 | Beeman | 4/220 |
| 1,144,193 | 6/1915 | Haas | 55/87 |
| 1,383,938 | 7/1921 | Hageman | 4/220 |
| 3,155,472 | 11/1964 | Huppke | 261/DIG. 26 |
| 3,342,271 | 9/1967 | Anthony, Jr. | 261/DIG. 26 |
| 3,442,602 | 5/1969 | Diehl | 422/4 |
| 3,638,402 | 2/1972 | Thomas | 55/307 |
| 3,847,571 | 11/1974 | Cole | 55/87 |
| 4,416,861 | 11/1983 | deVries | 422/4 |
| 5,030,253 | 7/1991 | Tokuhiro et al. | 55/90 |

FOREIGN PATENT DOCUMENTS 2448930  9/1980  France ................................ 422/4

Primary Examiner—Bernard Nozick
Attorney, Agent, or Firm—Pearne, Gordon, McCoy & Granger

[57] ABSTRACT

A method of treating gas includes the steps of (1) mixing pressurized air and treatment liquid and thereby generating treatment foam and (2) venting the gas through the treatment foam. Preferably, the liquid is liquid deodorant for deodorizing gas from a waste water treatment system. The treatment system is efficient, economical, uncomplicated and easy to install and operate.

7 Claims, 7 Drawing Sheets

VENT GAS DEODORIZING SYSTEM

BACKGROUND OF THE INVENTION

The present invention relates to a system for deodorizing and/or treating gas, particularly a system for deodorizing gas escaping from plumbing vents.

Conventional systems for deodorizing as escaping from plumbing vents treat the primary source of the odors, e.g., the waste Water itself. Other deodorizing systems treat all of the gas within a pipe, in a wet well or in a confined area. These systems are inefficient because only the escaping air has to be deodorized.

Other systems for deodorizing and/or treating vent gas as disclosed in U.S. Pat. Nos. 3,638,402; 1,383,938; 1,034,862 and 810,733. In U.S. Pat. No. 3,638,402, gases are filtered through copper mesh or metal wool. In U.S. Pat. Nos. 1,383,938 and 810,733, gas is treated by solid chemical material. In U.S. Pat. No. 1,034,862, dry formaldehyde gas is generated by vaporizing wood alcohol, and the formaldehyde is used to deodorize sewer gas. These systems have not gained market acceptance. This appears to be because the systems are complicated, expensive to manufacture, and/or do not make efficient use of chemical deodorant. Further, none of the known systems are capable of resupplying chemical deodorant from a remote location.

SUMMARY AND OBJECTS OF THE INVENTION

In view of the foregoing, it should be apparent that there still exists a need in the art for a system for deodorizing and/or treating gas, which is efficient, economical, uncomplicated, and easy to install and operate.

Accordingly, an object of the present invention is to provide a system for deodorizing and/or treating gas, which is efficient, economical, uncomplicated, and easy to install and operate.

Another object is to provide a system which uses foam to deodorize and/or treat as, preferably by making the as heavily laden with or saturated by chemical deodorant.

Another object is to provide a system for deodorizing gas only at a vent outlet.

Another object is to provide a gas treatment system which can be resupplied from a remote location.

Briefly described, these and other objects of the invention are realized by a system for deodorizing gas, which includes a mixing means for generating a deodorizing zone (such as a zone of deodorizing foam) and means for passing the gas through the deodorizing zone.

The present invention also relates to a system which includes: (A) means for mixing compressed or pressurized air and treatment liquid and for thereby generating treatment foam, including: (1) a reservoir for containing the liquid and (2) an air input for supplying the compressed air to a location which is inside of the reservoir; and (B) means for venting the gas through the treatment foam, including: (1) a first passageway for venting the gas downwardly toward the reservoir and (2) a second passageway for venting the gas upwardly away from the reservoir, the second passageway being located concentrically around the first passageway.

Other objects and features of the present invention will be apparent from the following detailed description and drawings which illustrate preferred embodiments of the invention.

BRIEF DESCRIPTION

DETAILED DESCRIPTION OF THE PREFERRED EMBODIMENT

Figure 1:
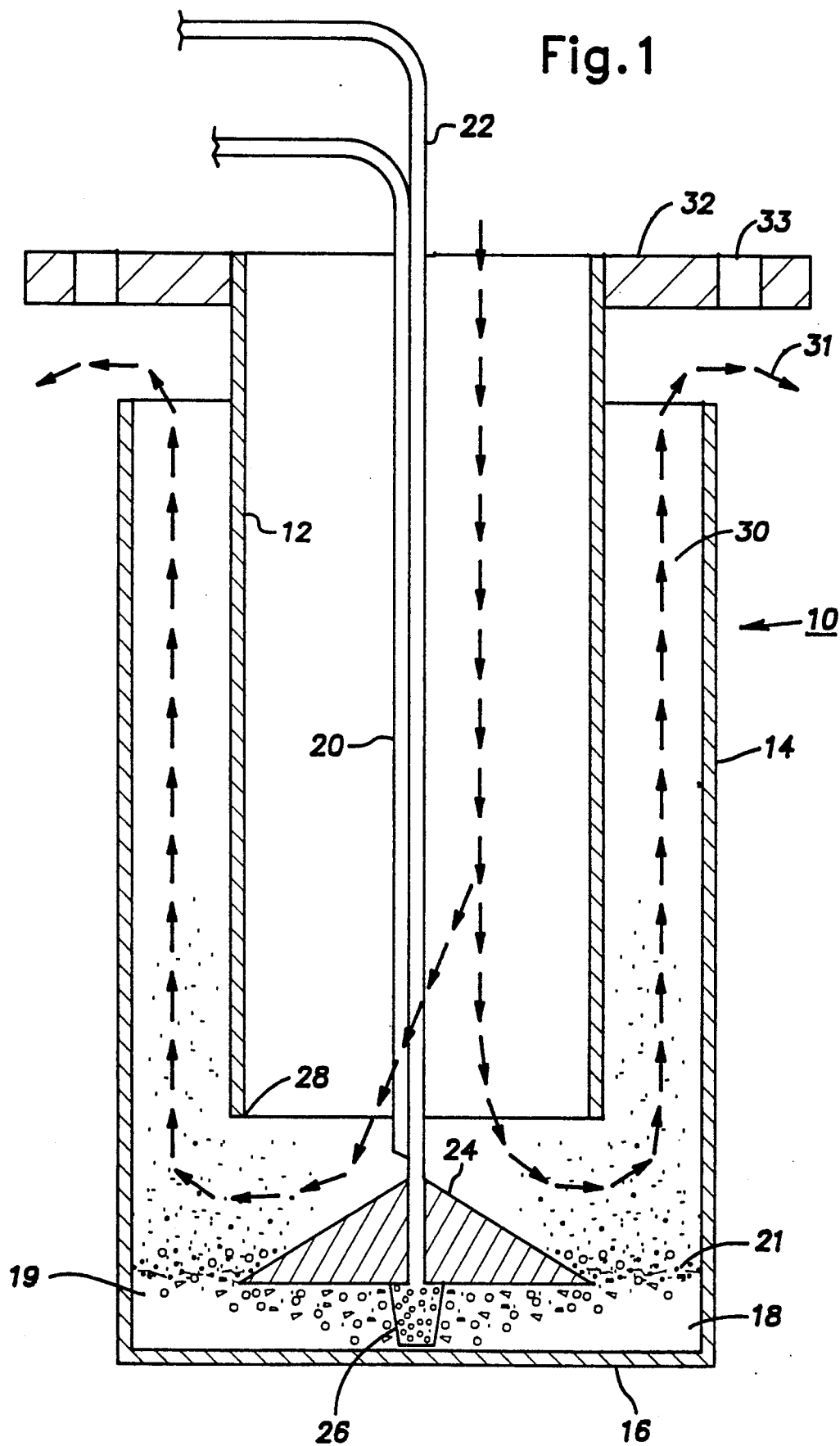
FIG. 1 is a cross-sectional view of a vent deodorizing head in accordance with a first preferred embodiment of the present invention.

Referring now to the drawings, wherein like reference numerals indicate like elements, there is shown in FIG. 1 a vent deodorizing head which is constructed in accordance with the principles of the present invention and which is designated generally by reference numeral 10.

The head 10 is formed of an inside pipe 12 and an outside pipe 14. The outside pipe 14 is located concentrically around the inside pipe 12. Preferably, the pipes 12, 14 are circular. The outside pipe 14 has a bottom wall 15 so as to form a reservoir or container 18 beneath the inside pipe 12. The head 10 also has two supply pipes 20, 22 for supplying liquid deodorant and compressed air, respectively, to the reservoir 18. The head 10 also has a dispersion plate 24. The dispersion plate 24 is generally circular in plan view and preferably has approximately the same diameter as the inside pipe 12. The deodorant supply pie 20 extends down through the center of the inside pipe 12 and terminates above the dispersion plate 24. The air supply pipe 22 also extends down through the center of the inside pipe 12, but passes through the dispersion plate 24 and terminates at an aerating head 26. The aerating head 26 has a large number of small holes. The location of the aerating head 26 is designed to be below the liquid level 19 in outside pipe 14.

In operation, odorous gases (such as air from an outlet vent pipe of a waste water treatment system), pass downwardly through the inside pipe 12, around a bottom edge 28, and then upwardly through a concentric passageway 30 formed between the outside pipe 14 and the inside pipe 12. The gas flow pattern is indicated by arrows 31. Meanwhile, the reservoir 18 is filled with liquid deodorant (from the supply pipe 20) such that the level 19 of the liquid deodorant is approximately even with the bottom of the dispersion plate 24. Compressed or pressurized air is supplied through the supply pipe 22, causing bubbles to be formed when the air passes through the holes in the aerating head 26, below the level of supplied deodorant 19. The bubbling action generates deodorizing foam 21. Generally, all commercially-available liquid deodorants will foam when air is injected into them; such deodorants have a water base or are miscible in water and include as a treating agent a pleasant perfume or scent that masks the objectionable odor of the gas being treated. The dispersion plate 24 generally causes the foam 21 to form at locations radially outwardly from the aerating head 26 at an annular zone communicating with and directly beneath the concentric passage or passageway 30. The foam can travel upwardly into the concentric passageway 30. There, the escaping or vented air must pass across the foam 21 that is beneath the lower edge 28 of the inner pipe and over or through any foam in the passageway 30 and is deodorized by being heavily laden or saturated with the chemical deodorant. It is believed that the phenomena that occurs in the head is that the bubbles of the foam burst and throw droplets of deodorizing liquid into the gas passing over the reservoir 18 and into the passage 30. Any portion of the droplets from the foam not absorbed or otherwise carried away by the gas returns by gravity to the reservoir 18.

Figure 2:
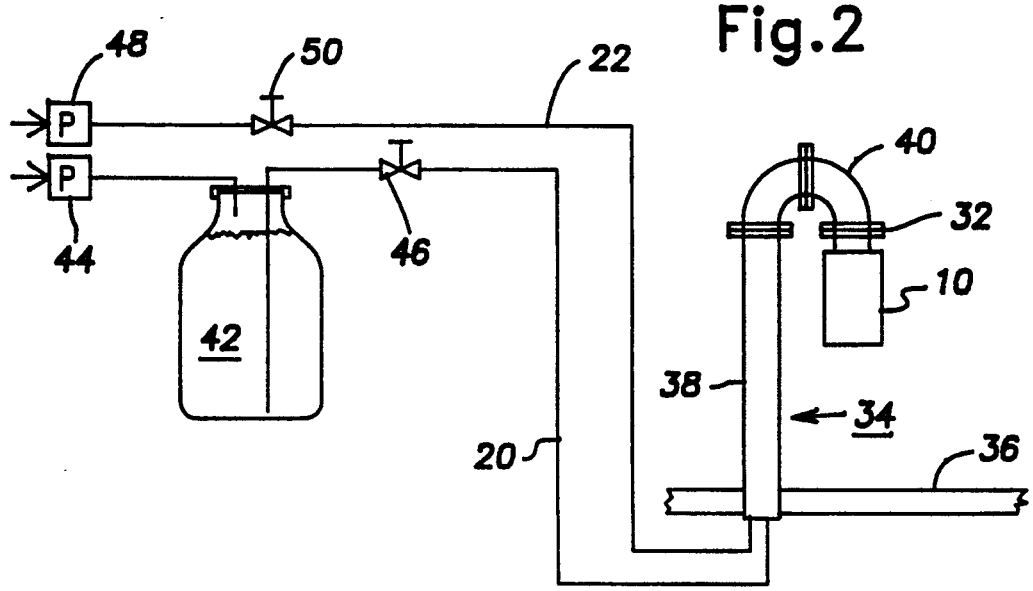
FIG. 2 is a schematic view of a vent deodorizing system in accordance with the first preferred embodiment of the present invention.

The vent deodorizing head 10 has a mounting flange 32 with bolt holes 33 for bolting the head 10 to the outlet of a vent pipe 34 (FIG. 2).

As shown in FIG. 2, the vent pipe 34 is designed to vent gases from a waste water treatment system 36. In operation, the gases are vented upwardly through a first stack 38, then through a J-connection 40 and then downwardly through the deodorizing head 10.

The liquid deodorant is supplied to the head 10 from a main supply container 42 which is pressurized by a pressurizing source 44. The supply of the liquid deodorant is controlled by a valve 46, either manually or automatically. The compressed air is supplied from a pressurized source 48, and the supply of the compressed air is controlled by a valve 50, either manually or automatically.

Figure 4:
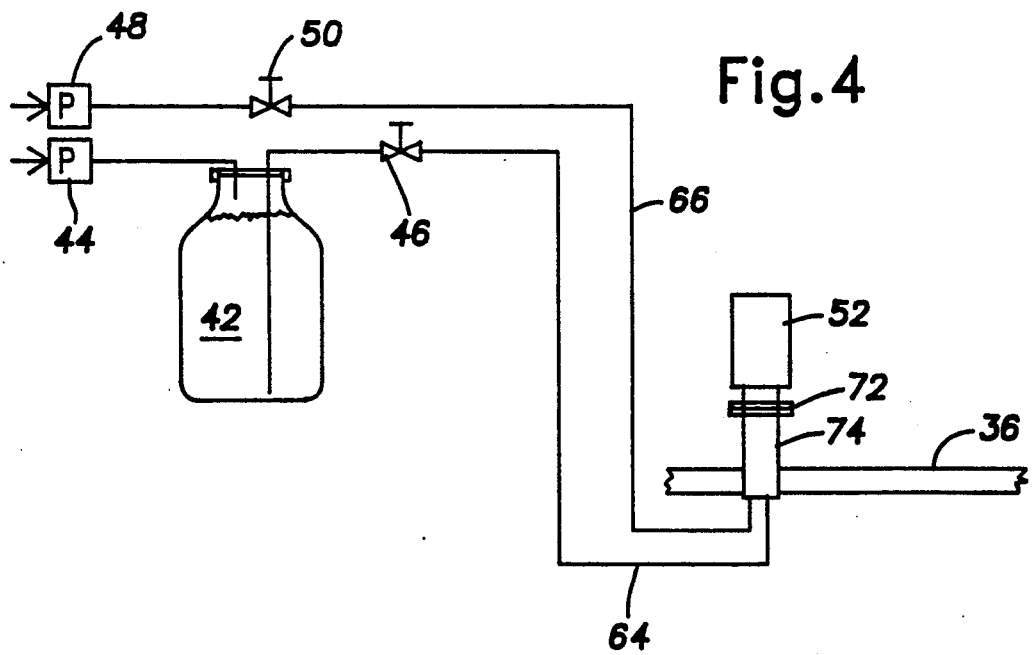
FIG. 4 is a schematic view of a vent deodorizing system in accordance with the second preferred embodiment of the present invention.
Figure 3:
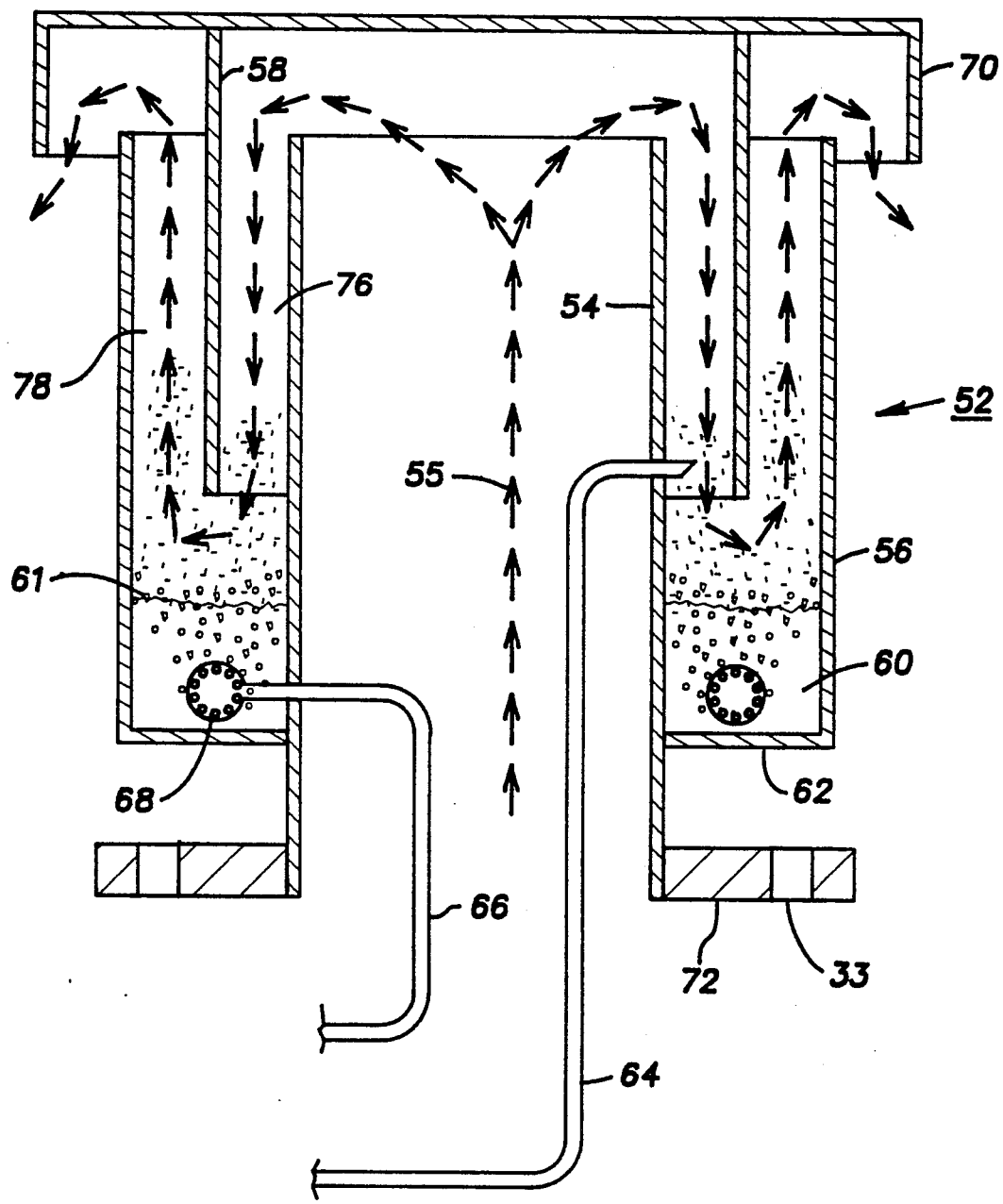
FIG. 3 is a cross-sectional view of a vent deodorizing head in accordance with a second preferred embodiment of the present invention.

A vent deodorizing head 52 for an updraft pipe in accordance with a second preferred embodiment of the present invention is illustrated in FIG. 3. The head 52 has an inner pipe 54, an outer pipe 56 and a middle pipe 58. A reservoir 60 for containing liquid deodorant is located between the outer pipe 56 and the inner pipe 54. An annular bottom plate 62 spans the distance between the inner and outer pipes 54, 56 and forms the bottom of the reservoir 60. The liquid deodorant is supplied to the reservoir 60 through a supply pie 64 and compressed air is supplied to the reservoir 60 through a supply pipe 66 which terminates at an annular aerating head 68. The vent deodorizing head 52 is covered by a cap 70 which is secured to the middle pipe 58. The head 52 also has a mounting flange 72 for connecting the head 52 to the outlet of a vent stack 74 (FIG. 4).

Thus, in operation, vent gas from the waste water treatment system 36 passes upwardly through the inner pipe 54, as indicated by arrows 55, then downwardly through a concentric passageway 76 defined between the inner pipe 54 and the middle pipe 58, then upwardly through a concentric passageway 78 defined between the outer pipe 56 and the middle pipe 58. The reservoir 60 is filled with liquid deodorant from the supply pipe 64 and compressed gas is supplied through the supply pipe 64 and aerating head 68. Thus, foam 61 is generated and travels upwardly into the passageways 76, 78, creating a deodorizing zone. There, the odorous gases pass through the foam and are thereby deodorized.

Figure 5:
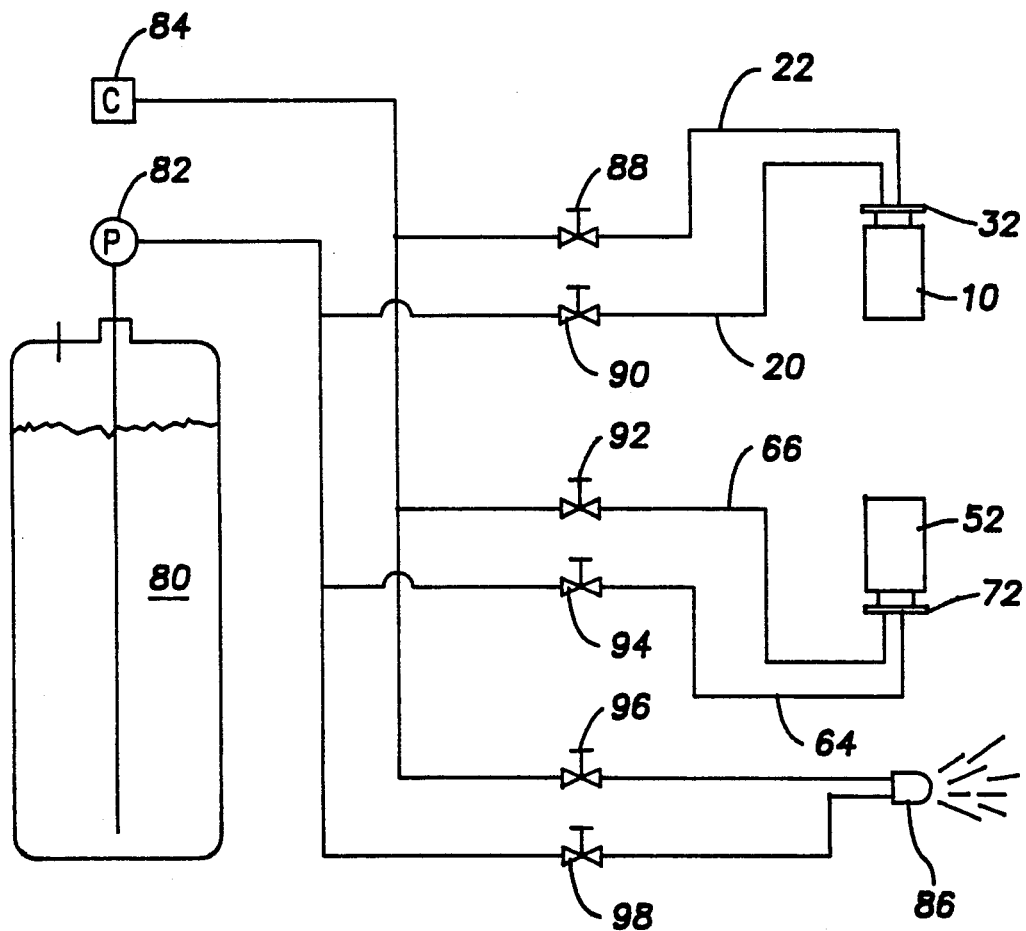
FIG. 5 is a schematic view of a vent deodorizing system in accordance with a third embodiment of the present invention.

FIG. 5 discloses a system which includes a deodorizing head 10 like that illustrated in FIG. 1 and a deodorizing head 52 like that illustrated in FIG. 3. Liquid deodorant is supplied to the heads 10, 52 from a common source 80. The liquid is pumped from the source 80 by a pump 82. Compressed air is supplied to the heads 10, 52 from a common source 84. The sources 80, 84 may also be connected to an atomizer 86 for supplying atomized deodorant to a desired location. The supply of the liquid deodorant and the compressed gas may be selectively controlled by individual valves 88-98.

Figure 8:
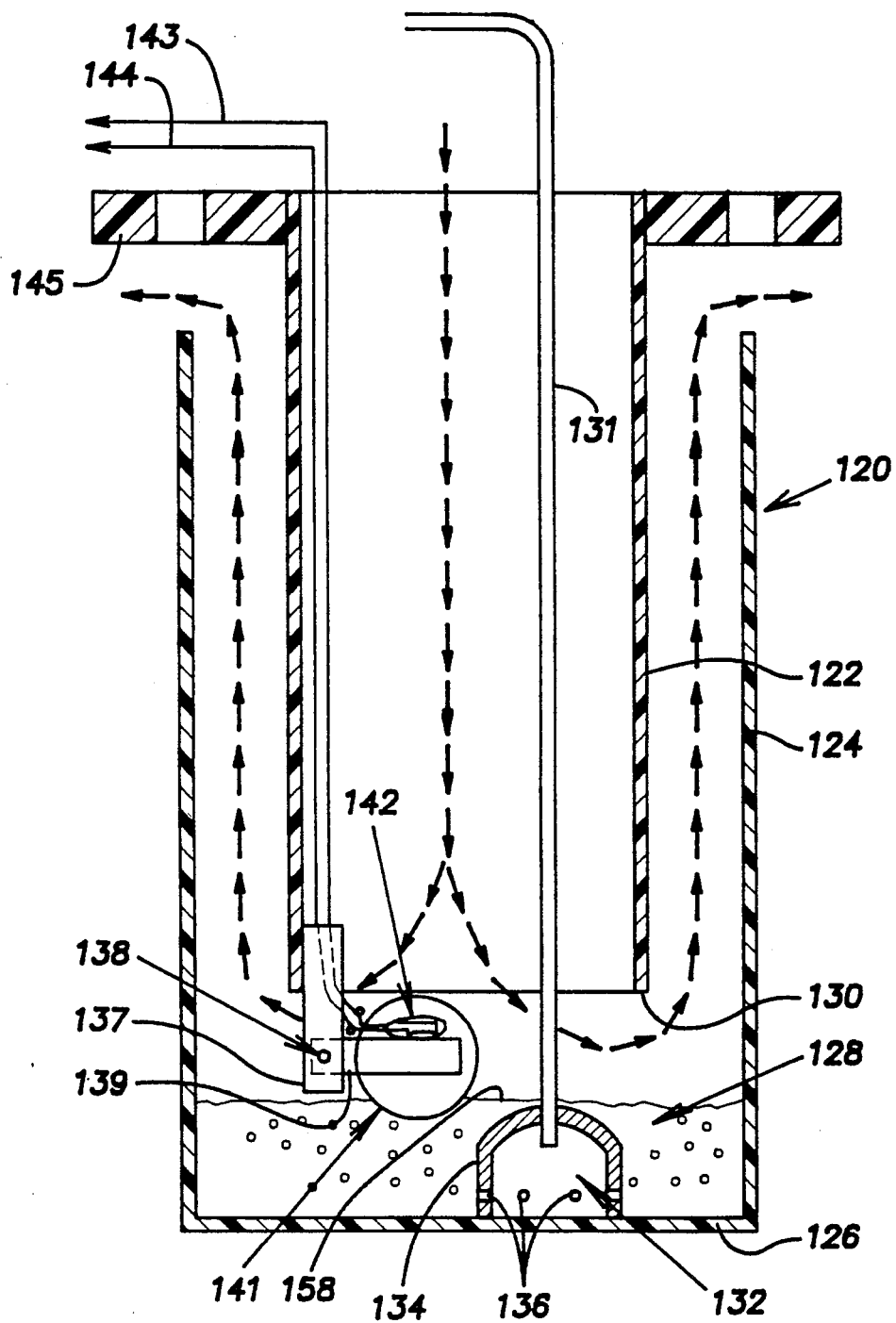
FIG. 8 illustrates another form of deodorizing head in which the level of liquid deodorant is automatically maintained with an electrical control.

FIG. 8 shows another form of deodorizing head 120 that includes a cylindrical inside pipe 122 and a concentric outside pipe 124. A bottom wall 126 integral with the outside pipe 124 forms a reservoir 128 beneath a lower edge 130 of the inside pipe 122. The head 120 includes a supply tube or nipple 131 that extends axially through the inside pipe 122 and connects with the interior of a bell-shaped aerating head 132 A cylindrical skirt 134 of the aerating head 132 is provided with a plurality of circumferentially spaced radial holes 136 adjacent its lower edge.

A bracket 137 fixed to the lower end of the inside pipe 122 supports a pivot pin 138 for an arm 139 of a ball float 141. A mercury electric switch 142, of known construction, is fixed to the arm 139. The switch 142 is arranged to provide electrical continuity between a pair of insulated electrical leads 143, 144 when the float 141 drops below the level indicated in FIG. 9 and interrupts such continuity when the float is at or above the level indicated in FIG. 9.

Figure 9:
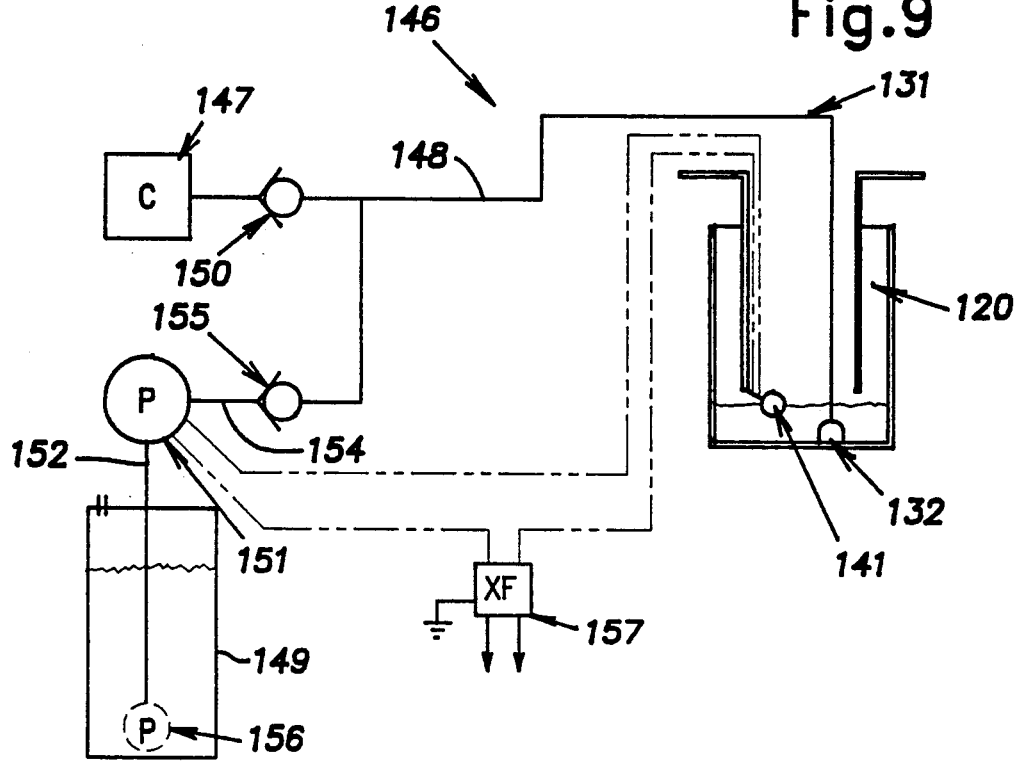
FIG. 9 illustrates a control and supply system for operating the deodorizing head of FIG. 8.

The head 120 is provided with a mountain flange 145 for bolting to a vent pipe like the pipe 34 in FIG. 2 and the head is utilized in essentially the same manner as the head 10 of FIG. 1. An example of a fluid supply and control system 146 for the head 120 is illustrated in FIG. 9. A compressor 147 supplies compressed air through a check valve 150 to a line 148 that is connected to the supply tube 131 of the head 120. A supply tank 149 contains a large quantity of liquid deodorant sufficient to operate the head 120 for an extended time period such as a week or a month. An electrically operated pump 151 has an inlet 152 in the supply tank 149 and an outlet 154 connected to the line 148 through a check valve 155. Alternatively, the pump 151 can be a submerged unit as shown in phantom at 156.

From FIG. 9 it will be seen that the compressed air and liquid deodorant are delivered to the aerator head 132 and reservoir 128 by the same line 148 and tube 131. The pump 151 is arranged to supply liquid deodorant at a pressure greater than the pressure of air delivered by the compressor 147. For simplicity and safety, a transformer 157 supplies low voltage alternating current for operating the pump 151. The transformer 157 is connected to the pump 151 through the float switch 142 so that when the liquid deodorant in the reservoir 128 is lowered by absorption into the gas being treated, the circuit through the switch is completed and the pump is operated to automatically maintain a predetermined level of liquid indicated at 158. The switch 142 opens the circuit to stop the pump 151 when the predetermined level is obtained. The predetermined level 158 is set below the lower edge 130 of the inside pipe 122 so that gas passing through the head 120 is not restricted by a liquid head which would otherwise exist if the level 158 was above this lower edge.

Air forced into the aerator head 132 by pressure developed by the compressor 147 causes bubbles to be formed in the liquid deodorant in the reservoir 128. The bubbles, in turn, produce a foam above the liquid level 158. It has been found that the radially directed holes 136 in the aerator head 132 are sufficiently effective at producing bubbles and distributing the same throughout the reservoir 128 so as to avoid the need for a dispersion plate 24 provided in the head 10 of FIG. 1. If desired, air from the compressor 147 and liquid deodorant from the pump 151 can be conveyed to the head 120 by separate lines in the manner illustrated for the head 10 of FIG. 1. In such case, the air line is connected to the interior of the aerator head 132 and the liquid line can terminate at a convenient location that communicates with the reservoir 128.

Figure 10:
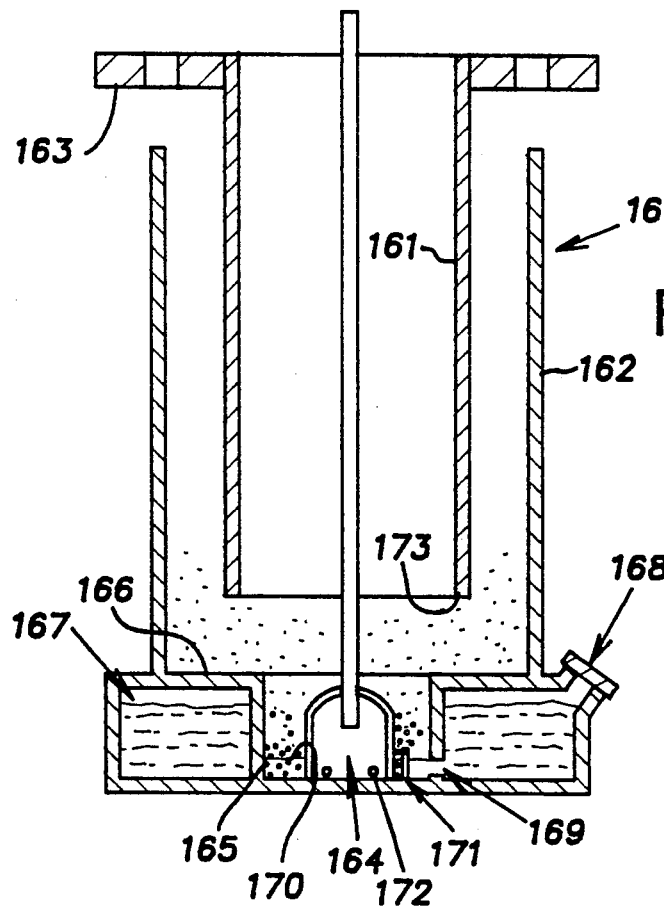
FIG. 10 illustrates still another embodiment of the deodorizing head for automatically maintaining a level of liquid deodorant in the head.

FIG. 10 illustrates another embodiment of the invention where a head 160 includes inner and outer concentric cylindrical pipes 161, 162. The head 160 is mounted with a flange 163 in a manner corresponding to the flange 32 of the head 10 to a J-vent of a waste water treatment system or other source of gases to be treated. Compressed air is delivered to an aerator head 164 like the head 132 of FIG. 8. The aerator head 164 is surrounded by an annular liquid deodorant reservoir 165 formed by an inner end wall 166 on the lower end of the outer pipe 162. An outer annular liquid supply chamber 167 is also formed by walls integral with the lower end of the outer pipe 162. The chamber 167, which is liquid-tight, has a fill cap 168 that is manually removable to replenish the supply of liquid deodorant. A liquid level control hole 169 permits liquid to escape from the supply chamber 167 to automatically maintain a level 170 of liquid in the reservoir 165 that corresponds to the top of the hole 169 in a known liquid dispensing xanner. A short wall 171 of limited circumferential extent provides a bubble barrier between the hole 169 and the aerating head 164. Air escaping radial holes 172 in the aerator head 164 from a source of pressurized air produces bubbles which produce foam in the space enveloping the lower end, designated 173, of the inner pipe 161 for treatment of gases as previously described in connection with the head 10 of FIG. 1.

Other systems besides the electrical float switch and electrical pump illustrated in FIG. 9 are contemplated for automatically maintaining the level of liquid deodorant in a bubblinq reservoir. For example, a mechanical valve and float device analogous to that found in an automotive carburetor can be used. As an alternative to the electrical float switch, an electronic liquid level control sensing device, known in the art, can be disposed in the liquid deodorant reservoir. The supply of liquid deodorant remote from the reservoir of a head can be maintained in a pressurized state or can be elevated above the reservoir and dispensed into the reservoir through a solenoid valve controlled by a float switch or an electronic liquid level control.

The deodorizing foam need not necessarily be generated at the location where the gas is to be treated. That is, the compressed air and the liquid deodorant may be first mixed to generate the foam and then the foam may be supplied or transported to a remote location to deodorize the gas at the remote location.

Figure 6:
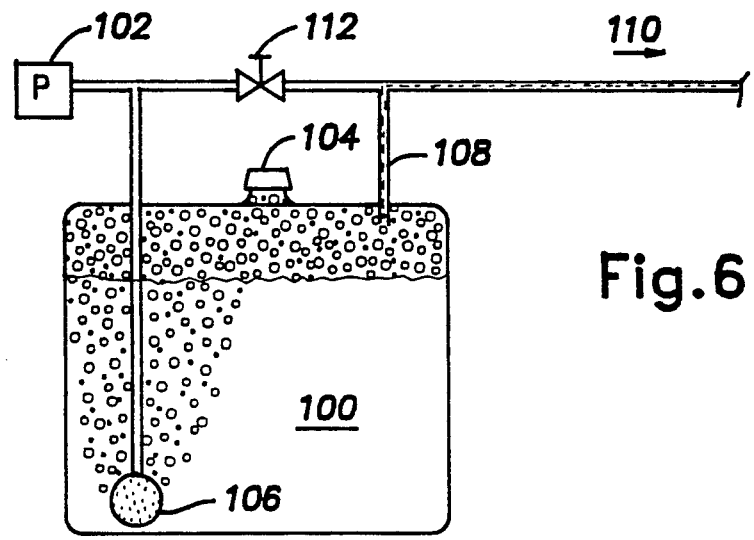
FIG. 6 is a schematic view of a foam supplying system in accordance with the present invention.

A first preferred system for generating foam and for supplying the foam to a remote location is illustrated in FIG. 6. This system includes a container 100 for containing a supply of liquid deodorant and a source of compressed air 102 for pressurizing the contents of the container 100. The container 100 may be re-filled through a re-sealable opening 104. In the embodiment illustrated in FIG. 6, the compressed air is directed to an aerating head 106 which causes foam to be formed within the container 100. The foam travels through an outlet pipe 108 and then to a remote location in the direction indicated by arrow 110. Some of the compressed air from the source 102 may be directed through a valve 112 to control the density of the foam.

Figure 7:
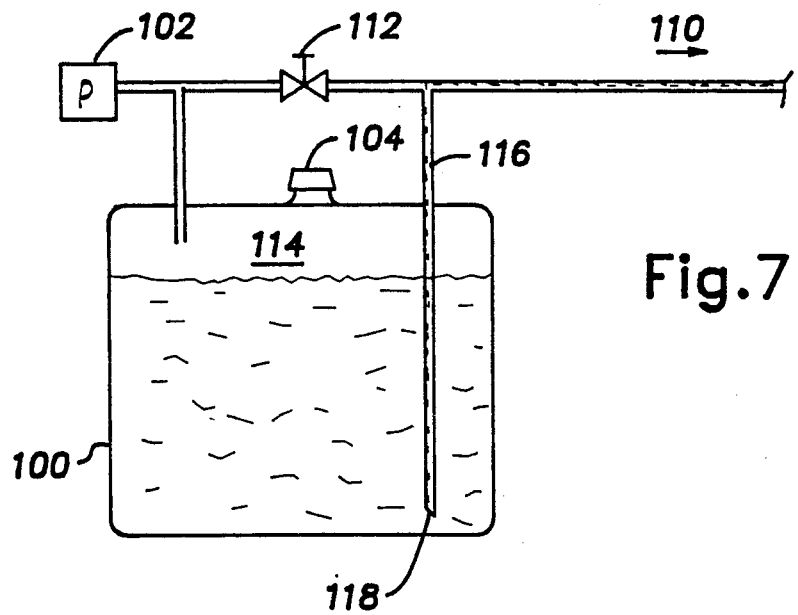
FIG. 7 is a schematic view of another foam supplying system in accordance with the present invention.

Another preferred system for generating and for supplying foam to a remote location is illustrated in FIG. 7. In this system, compressed air is supplied from the source 102 to a head space 114 within the container 100. This causes the liquid to travel upwardly through an outlet pipe 116 whose inlet 118 is submerged within the liquid deodorant. Some compressed air passes through the valve 112 and mixes with the liquid. Thus, foam is generated as the mixture travels toward the remote location in the direction indicated by the arrow 110. In the systems of FIGS. 6 and 7, the valve 112 can by cyclic or time proportional.

The present invention is not limited to the preferred embodiments shown and described herein. In particular, the invention is not limited to the deodorization of gases emanating from waste water treatment systems. The invention may be used for other purposes, including various gas treatment processes. Further, numerous details of the preferred embodiments may be changed without departing from the principles of the invention. For example, the mounting flanges 32 and 72 are illustrated with bolt holes 33 for a bolted connection to the vent pipes 34 and 74, respectively. However, threaded, welded or fused connections may be used instead.

I claim:

1. A method for treating a gas, such as gas released by waste water, flowing through a passage comprising the steps of providing in a reservoir a liquid that is foamable and has a composition that includes a deodorizing treating agent, foaming the liquid by forcibly introducing air into it at a location within the reservoir, disposing the foam in a space, confining the gas for flow through a passage that communicates with the space, allowing the bubbles of the foam to burst and throw droplets of the liquid into the path of the gas as it flows through the passage whereby said droplets are caused to be absorbed into the gas in the passage to thereby treat it.

2. A method as set forth in claim 1, wherein the foam is generated in the reservoir below the passage and the passage is arranged to allow non-absorbed liquid droplets to return by gravity to the reservoir for refoaming.

3. A system for treating gas such as gas released by waste water, the system comprising:
    means for mixing pressurized air and a foamable deodorant treatment liquid and for thereby generating treatment foam, comprising a reservoir for containing the liquid and an air input for supplying the pressurized air to a location which is inside of the reservoir;
    a zone above the reservoir for receiving and containing foam generated by the foam generating means, and
    means for introducing the gas through the treatment foam in said zone, comprising a first passageway for introducing the gas into said zone and a second passageway for venting the gas away from said zone, the second passageway being located concentrically around the first passageway.

4. The system of claim 3, wherein the mixing and foam generating means comprises a dispersion plate for directing the foam radially outwardly toward the second passageway, and wherein the air input further comprises a supply pipe which extends through the dispersion plate and an aerating head which is located beneath the dispersion plate.

5. The system of claim 3, wherein the venting means further includes a third passageway for venting the gas toward the first passageway, and wherein the reservoir is located concentrically around the third passageway.

6. Apparatus for treating a gas such as gas released by waste water, comprising a passage for conducting a flow of the gas therethrough, a container for a deodorant liquid that is foamable when air is forced through it and that has a composition which includes a treating agent, means for forcibly introducing air into the container through the liquid to produce foam, the passage including means for exposing the foam produced in the container to the gas flowing in the passage in a manner whereby liquid droplets produced by bursting bubbles of the foam are thrown into the gas flowing in the passage to be absorbed by such gas for treatment, the container being disposed below a portion of the passage, and the exposing means, passage and container being arranged to recover by gravity into the container any droplet liquid material not absorbed by the gas for refoaming.

7. Apparatus as set forth in claim 6, including means for automatically maintaining a level of liquid in the container for replenishment of such liquid being absorbed by the gas being treated.

* * * * *